United States Patent [19]

Kanbe et al.

[11] Patent Number: 4,682,858

[45] Date of Patent: Jul. 28, 1987

[54] LIQUID CRYSTAL DEVICE HAVING REDUCED-PRESSURE REGION IN COMMUNICATION WITH FERROELECTRIC LIQUID CRYSTAL

[75] Inventors: Junichiro Kanbe, Yokohama; Shinjiro Okada, Kanagawa; Tohru Takahashi, Tokyo; Yujiro Ando, Yokohama, all of Japan

[73] Assignee: Canon Kabushiki Kaisha, Tokyo, Japan

[21] Appl. No.: 763,712

[22] Filed: Aug. 8, 1985

[30] Foreign Application Priority Data

Aug. 20, 1984 [JP] Japan ................. 59-171529
Dec. 7, 1984 [JP] Japan ................. 59-258566
Dec. 13, 1984 [JP] Japan ................. 59-263663

[51] Int. Cl.$^4$ ............................... G02F 1/13
[52] U.S. Cl. ..................... 350/334; 350/344; 350/350 S
[58] Field of Search ............. 350/334, 343, 344, 350 S

[56] References Cited

U.S. PATENT DOCUMENTS

| | | | |
|---|---|---|---|
| 4,130,408 | 12/1978 | Crossland et al. | 350/344 X |
| 4,407,870 | 10/1983 | Clerc et al. | 350/343 X |
| 4,443,063 | 4/1984 | Nishiyama | 350/344 X |
| 4,528,562 | 7/1985 | Crossland et al. | 350/350 S X |
| 4,548,475 | 10/1985 | Brendle et al. | 350/344 X |

*Primary Examiner*—John K. Corbin
*Assistant Examiner*—Richard F. Gallivan
*Attorney, Agent, or Firm*—Fitzpatrick, Cella, Harper & Scinto

[57] ABSTRACT

A liquid crystal cell having a pair of substrates disposed with a gap therebetween and a liquid crystal injected through a liquid crystal injection port and enclosed in the gap between the substrates. The liquid crystal cell has spacer members disposed on at least one of the substrates, a liquid crystal layer region, the thickness of which is regulated by the spacer members, and a reduced pressure space communicating with the liquid crystal layer region.

42 Claims, 10 Drawing Figures

LIQUID CRYSTAL DEVICE HAVING REDUCED-PRESSURE REGION IN COMMUNICATION WITH FERROELECTRIC LIQUID CRYSTAL

FIELD OF THE INVENTION AND RELATED ART

The present invention relates to a structure of a liquid crystal cell adapted for use as a display device or optical modulation device utilizing electro-optical effect or thermo-optical effect, and more particularly to a liquid crystal cell or device adapted for providing a thin and uniform liquid crystal layer, particularly such a layer of a ferroelectric liquid crystal, and therefore providing a liquid crystal cell suitable to be formed in a large area, and also to an apparatus comprising such a liquid crystal cell or device.

Hitherto, there have been known methods for regulating the thickness of a liquid crystal layer in a liquid crystal cell (hereinafter sometimes referred to simply as "cell thickness" for convenience) including one wherein a cell thickness is regulated at the periphery of a pair of oppositely spaced substrates or base plates by admixing a gap-forming material in an adhesive for bonding the substrates, and one wherein a gap-forming material is dispersed in a liquid crystal. It is possible by these methods to form a cell with a thickness of the order of 6μ or more if the cell is of a small area, whereas irregularity in thickness due to undulation or warping of substrates cannot be completely avoided if the cell is of a large area. Further, when a liquid crystal device is prepared by using a ferroelectric liquid crystal on which research for development has been extensively conducted in these days, the optimum thickness of the liquid crystal layer is frequently of the order of 3μ or less in view of the operation characteristics as a device. It is almost impossible to form a cell with such a thin liquid crystal layer in a uniform thickness.

More specifically, there have been known various display devices or apparatus with a high density of picture elements such as those using a passive matrix electrode structure or an active matrix electrode structure. Most of these display devices have utilized the electro-optical modulation function of TN (Twisted Nematic) liquid crystal.

However, such a display device using a passive matrix electrode structure is accompanied with several problems such as occurrence of crosstalk or lowering in contrast due to decrease in duty factor as the number of scanning lines increases. On the other hand, as a display device having an active matrix electrode structure, one using a switching element (e.g., a thin film transistor) connected to each picture element has been known. However, such a display device requires complicated steps for production of the switching element and moreover it is difficult to form such a display device in a large size.

As a device for solving the above described problems, a ferroelectric liquid crystal device proposed recently by Clark et al. (U.S. Pat. No. 4,367,924) has been attracting attention. The ferroelectric liquid crystal device has been known to have a memory function by regulating the cell thickness to form a thin layer of 0.1μ to 3μ.

However, according to our experiments, if there is irregularity in the thickness of the liquid crystal layer for the ferroelectric liquid crystal device having a memory function as described above, there also arises remarkable irregularity in performance such as threshold characteristic and response speed. Particularly, through our experiments, it has been observed that the tolerance in thickness should be 10% or less with respect to a liquid crystal layer of, e.g., 1μ in thickness.

In contrast, for a liquid crystal device operated in TN-liquid crystal mode, the gap between substrates or base plates constituting a cell is relatively thick, e.g., of 6 to 10μ, and the performances such as threshold characteristic and response speed of the TN-mode liquid crystal device do not remarkably change even if some irregularity occurs in the gap thickness. Accordingly, the conventional cell assembling technique developed mainly for the TN-mode liquid cyrstal device does not pay due attention to the assembly of a cell structure as described above requiring a very thin layer and uniform thickness in combination. Particularly, the above-mentioned ferroelectric liquid crystal device having a memory function as proposed by Clark can be applied to a large area display (e.g., 12 inches or larger in diagonal line size). The assembly of such a cell structure capable of providing a large picture with a cell gap of, e.g., 1μ and tolerance therein of 10% or less involves its own problems which cannot be solved by application of the conventional cell assembling technique.

SUMMARY OF THE INVENTION

An object of the present invention is to provide a liquid crystal cell having a uniform cell thickness by obviating irregularity in cell thickness due to undulation or warping of substrates or base plates.

Another object of the present invention is to provide a liquid crystal cell free from influence of temperature change and having excellent environmental stability.

Another object of the present invention is to provide a liquid crystal cell with a very thin liquid crystal layer which cannot be accomplished by the conventional technique.

A further object of the present invention is to provide a liquid crystal cell which can be produced at a low cost and good productivity.

A still further object of the present invention is to provide a ferroelectric liquid crystal device with a cell structure having a very thin clearance between base plates of the order of 0.1 to 3μ and also very small irregularity in clearance.

According to one aspect of the present invention, there is provided a liquid crystal cell of the type comprising a pair of substrates disposed with a gap therebetween and a liquid crystal injected through a liquid crystal injection port and enclosed in the gap between the substrates; the liquid crystal cell comprising: spacer members disposed on at least one of the substrates, a liquid crystal layer region, the thickness of which is regulated by the spacer members, and a reduced pressure space communicating with the liquid crystal layer region.

According to another aspect of the present invention, there is provided a liquid crystal cell comprising: a cell structure comprising a pair of substrates, at least one of which is flexible, disposed with a gap therebetween and a plurality of spacer members disposed between the substrates to hold the gap, and a ferroelectric liquid crystal enclosed in the cell structure; the spacer members being disposed with a spacing a [mm] from each other satisfying the relationship of $$\frac{a^4}{Et^3} < 0.32$$

wherein E denotes the modulus of elasticity [Kg.f/mm$^2$] of the flexible substrate and t denotes the thickness [mm] of the flexible substrate.

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

Figure 1:
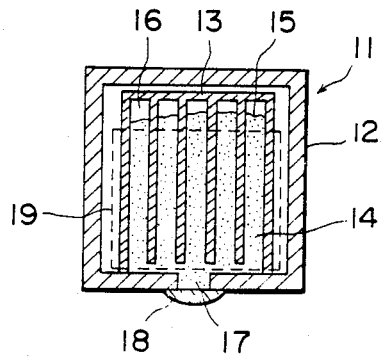
FIGS. 1, 2A and 3 respectively show a section of an embodiment of the liquid crystal cell according to the present invention taken in parallel with the substrates or base plates.

FIG. 1 is a sectional view of a first embodiment of the liquid crystal cell according to the present invention, taken in parallel with the substrates or base plates to show the interior. One substrate 11 is made of, e.g., a glass plate, a rigid or flexible plastic plate, etc., along the periphery of which is formed an adhesive member 12 for bonding with the other opposite substrate (not shown). Spacer members 13 are disposed on the central portion of the substrate 11 surrounded by the adhesive member 12 so as to fulfil the function of regulating the thickness of the liquid crystal layer. The spacer members 13 are formed in a desired pattern, for example, by applying a polyimide in a prescribed thickness as a coating and subjecting the coating to photoetching. Otherwise, the substrate 11 per se may be etched in a pattern so as to leave the spacer members 13. A monoaxial orientation treatment such as the rubbing has been applied to either one or both of the substrates as desired for orienting or aligning the liquid crystal. A liquid crystal layer region 14 is formed so as to be defined by the spacer members 13 and thus is adjacent to or communicated with a reduced pressure space 16 through an interface 15. Such a liquid crystal layer 14 may be formed by injecting a liquid crystal through a liquid crystal injection port 17 and sealing the injection port with a sealant. As the liquid crystal material, a ferroelectric liquid crystal material, DOBAMBC, may for example be used. The required orientation state of the liquid crystal may be obtained by gradually cooling it from the isotropic phase to the SmC phase thereof. For reference, when the liquid crystal cell is used as an electrooptical device, electrodes are formed on the substrate 11, but they are not illustrated in the figure for brevity.

The manner of hermetically disposing the liquid crystal will now be explained in more detail. A substrate 11 with spacer members 13, for example, formed thereon and a flexible opposite substrate such as that of a polyester film are bonded to each other with an epoxy-type adhesive 13, etc., thereby to form a blank cell. Then, the cell is held in a vacuum container to sufficiently evacuate air in the cell, and the injection port 17 of the cell is immersed in a liquid crystal. An inert gas such as N$_2$ is introduced into the vacuum container to increase the pressure outside the cell thereby to inject the liquid crystal material under pressure into the cell. When a predetermined region 19, e.g., an image or picture region of about 100 mm × 100 mm in size is filled with the liquid crystal material, the injection is terminated and the injection port 17 is sealed. The thus formed liquid crystal cell is, because of a reduced pressure space 16 retained therein, subject to a sufficient compression force when placed in an environment of the atmospheric pressure, whereby the opposite substrate (not shown) closely contacts the spacer members 13 and uniformity in thickness is realized in a large area even if the thickness is very thin, such as thin as 3μ or less. By forming the liquid crystal layer in a thickness of 3μ or less, a chiral smectic phase with a non-spiral texture as described hereinafter can be obtained. The reduced pressure space also has a function of preventing local variation in cell thickness due to heat expansion or shrinkage of the liquid cyrstal material when a liquid crystal cell is used under varying environmental conditions.

The volume of the reduced pressure space for accomplishing the above objects may preferably be 1/1000 or more, particularly 1/100 or more, with respect to the volume of the liquid crystal layer region. Further, the upper limit thereof should be restricted within such an extent as not to remarkably decrease the effective display area of the liquid crystal cell. The pressure in the reduced pressure space may appropriately be of the order of 1/10 to ½ atmosphere.

Figure 2A:
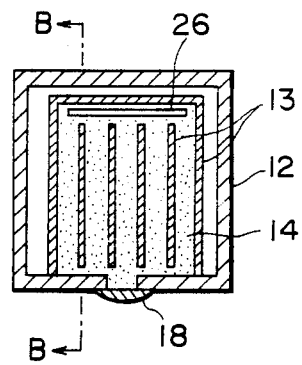
Figure 2B:
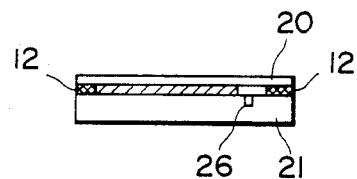
FIG. 2B shows a section taken along the line B—B in FIG. 2A as viewed in the direction of arrows.

FIGS. 2A and 2B show a further improved, second embodiment of the liquid crystal cell according to the present invention. FIG. 2A is a sectional view corresponding to FIG. 1 of the embodiment, and FIG. 2B is a sectional view taken along the line B—B in FIG. 2A. In this embodiment, one substrate 21 is provided with a reduced pressure space 26 in the form of a groove by means of etching on its inside face and is bonded to an opposite substrate 20. The reduced pressure space 26 in the form of a groove can provide a larger volume for a small area of substrate and therefore provide sufficient time for selecting the instant of terminating the injection of the liquid crystal material, whereby such a structure is appropriate for increasing productivity.

Figure 3:
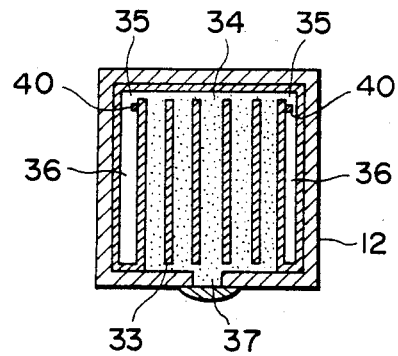

FIG. 3 shows a sectional view of a third embodiment.

In this embodiment, there is provided a narrow communicating part 35 between a liquid crystal layer region 34 and a reduced pressure space 36 so that the length of the path between the communicating part 35 and the injection port 37 will be equal to the maximum path length taken in the liquid crystal region 34 from the injection port 37. Because of this arrangement, such a trouble can be obviated that a lqiuid crystal is introduced also into the reduced pressure space while the liquid crystal is injected into the desired region.

At the communicating part 35 may be further formed a throat-forming member 40 for further narrowing the channel so that air left more or less in the reduced pressure space 36 is prevented from intruding into the liquid crystal region while the cell is in use. The throat-forming member 40 may be formed simultaneously with and of the same material as the spacer members 33.

Further to say, it is desirable to introduce another appropriate gas, e.g., an inert gas such as $N_2$, $CO_2$, Ar and Ne, instead of air into the above mentioned reduced pressure space 16, 26 or 36. For this purpose, the interior of a cell is evacuated to vacuum and then a desired gas is introduced into the cell up to a prescribed pressure of preferably 1/1000 to 1/10, followed by injection of liquid crystal to elevate the cell inner pressure to a prescribed pressure below 1 atmosphere, e.g., 1/10 to ½ atmosphere. The cell is then sealed and the environmental pressure surrounding the cell is raised to ordinary pressure.

As described above, according to the present invention, there is provided a liquid crystal cell wherein a reduced pressure space is provided so as to communicate with a liquid crystal layer while regulating the cell thickness by disposing spacer members in the liquid crystal region. As a result, a pair of substrates are closely held contiguous to the spacer members, whereby a liquid crystal cell with excellent characteristics such that the cell thickness is made constant and is not affected by change in temperature, etc., even when the cell has a large area and at least one of the substrates is flexible, is obtained.

In a display device comprising a cell structure wherein one of two substrates constituting a cell is provided as a flexible substrate and the flexible substrate is held closely adherent to spacer members, and a passive matrix electrode structure; failure of electrical connection can occur when electrical connection of an external controlling circuit and electrodes formed on the flexible substrate is effected by an anisotropic conductor material. Especially when a pressure is externally applied to the display device, the flexible substrate is deformed, whereby the connection with the external circuit can be peeled and/or breakage of conductor can occur. Particularly, since the number of wiring or conductors increases and the number of terminals per unit length increases as the picture elements are arranged in a higher density, the possibility of poor electrical connection and/or breakage of conductor increases.

For overcoming the above problem, the present invention further provides a structure comprising a nonflexible first substrate provided with a first group of electrodes, a first driving circuit connected to the first group of electrodes and a second driving circuit; a flexible second substrate provided with a second group of electrodes; and a ferroelectric liquid crystal disposed between the first and second substrates; the second group of electrodes being connected to the second driving circuit, the first and second circuits being respectively connected to an external circuit.

Figure 4A:
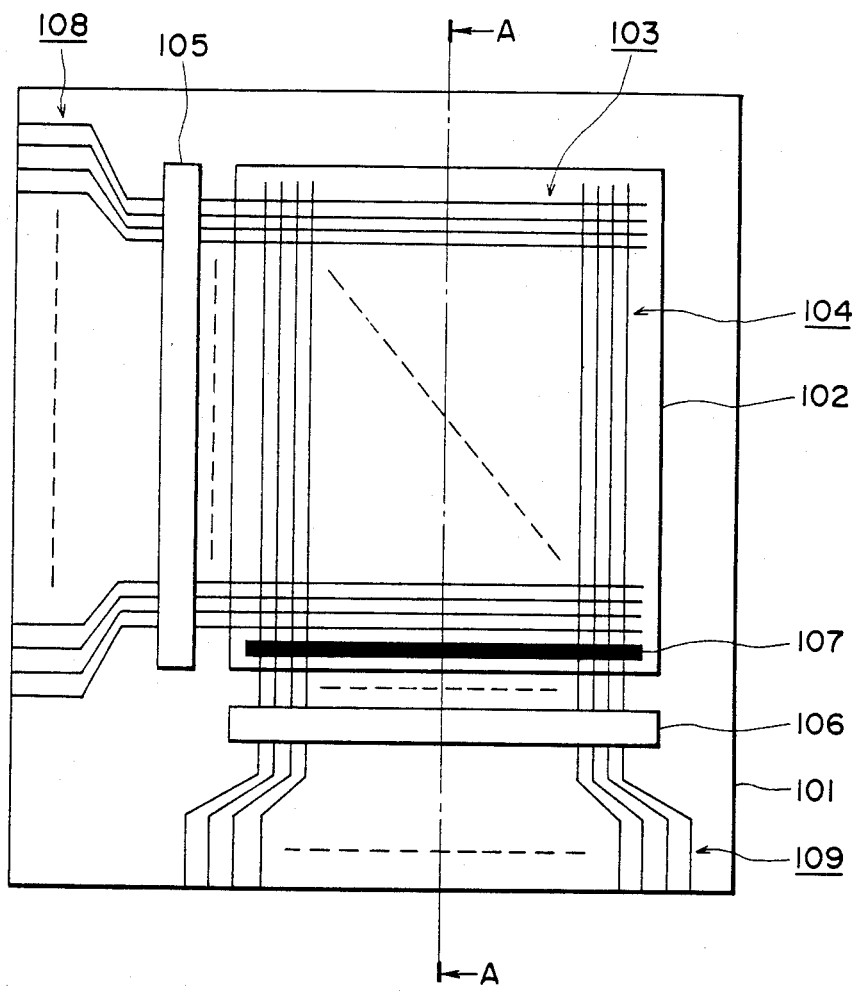
FIG. 4A is a schematic plan view for illustrating another embodiment of the liquid crystal cell according to the present invention.
Figure 4B:
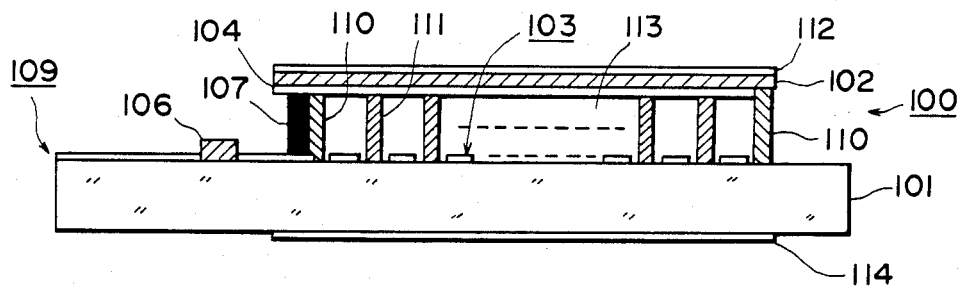
FIG. 4B is a view of A—A section in FIG. 4A.

FIGS. 4A and 4B show a liquid crystal cell comprising a (blank) cell 100 and a ferroelectric liquid crystal 113 sealed up inside the cell, wherein the cell structure 100 comprises substrates 101 and 102, a space or gap held between the substrates and spacer members 111 for keeping the space. The space formed between the substrates 101 and 102 are sealed up by the sealing member 110 to form a hermetically sealed structure. The substrate 101 should desirably be transparent, be provided with an optically anisotropic characteristic, and also have a sufficient strength for providing a self-standing property to the cell structure 100. The substrate may suitably be a glass plate having a thickness of about 1 to 5 mm, preferably about 0.3 mm to 2 mm while it depends on the area thereof.

On the substrate 101 are formed a transparent conductive film of, e.g., tin oxide, indium oxide and ITO (indium tin oxide) in the form of stripes and further spacer members 111 in a thickness of the order of $0.1\mu$ to $3\mu$. The spacer members 111 may be formed by first forming a film of a film-forming material including a resin or photoresist such as polyimide, polyamide or polyvinylalcohol and an inorganic insulating material such as $SiO_2$ or $TiO_2$ which can be formed into a film by vapor deposition in a thickness of the order of $0.1\mu$ to to $3\mu$, and then subjecting the film to etching according to a prescribed photolithographic technique into a desired shape such as stripes, lattice or cross stripes, or dots. It is advantageous to use a photosetting resin as a film-forming material in preparation of the spacer members 111, since the photosetting resin can be directly formed into the spacer members 111 without using a photoresist separately.

It is suitable to set the spacing between adjacent spacer members at 2 mm or less, preferably $800\mu$ or less. More specifically, adjacent stripe spacers are spaced apart from each other with a distance of 2 mm or less, preferably $800\mu$ or less. For lattice spacers, the longer side of a lattice unit should be 2 mm or less, preferably $800\mu$ or less. Further, dot spacers should be spaced apart from each other with a distance of 2 mm or less, preferably $800\mu$ or less.

On the substrate 101 are further disposed a driving circuit 105 for applying driving signals to the electrodes 103 and a driving circuit 106 for applying information signals to electrodes 104 described hereinafter. The driving circuits 105 and 106 may be formed of thin film transistors comprising semiconductor elements of amorphous silicon, polycrystalline silicon, cadmium selenide, etc. The source lines and gate lines for the driving circuits 105 and 106 are connected to terminals 108 and 109, respectively, disposed convergingly on the substrate 101.

After the above mentioned electrodes 103 and spacer members 111 are formed on the substrate 101, an orientation controlling effect for a ferroelectric liquid crystal which will be disposed in contact with the substrate is imparted to the substrate 101 by forming a film of polyimide, polyvinyl alcohol, etc., and rubbing the surface of the film or forming a film of $SiO_2$ by oblique vapor deposition. The substrate 101 may be formed of a nonflexible glass plate as described above or may be a flexible one as used for a substrate 102 described hereinbelow.

The flexible substrate 102 may be formed of, e.g., a thin glass sheet with a thickness of 20 to 300 $\mu$m or a plastic film. Electrodes 104 disposed on the flexible substrate 102 are electrically connected to the driving circuit 106 formed on the substrate 101 through an anisotropic conductor (a thermoplastic resin showing electroconductivity only in a vertical direction such as "CP1030" available from Sony Chemical K.K. or an anisotropically conductive adhesive film such as "Hitaserumu" available from Hitachi Kasei K.K.) and then connected to the terminals 109 so as to be further connectable with an external controlling circuit (not shown).

The substrate 101 is provided with the driving circuit 105 for applying driving signals to the electrodes 103 disposed thereon, and the terminals 108 for transferring control signals from an external controlling circuit (not shown) to the driving circuit 105.

The cell structure containing a ferroelectric liquid crystal 113 has a gap held by the spacer members 111 between the substrate 101 and the flexible substrate 102, and the periphery of the substrates 101 and 102 is sealed up with a sealing agent 110 such as an epoxy adhesive. The ferroelectric liquid crystal 113 has been oriented to form a monodomain. Such an orientation power has been provided by rubbing-treated polyimide film, polyvinyl alcohol film, etc., or by obliquely vapor-deposited $SiO_2$ film, etc.

On both sides of the cell structure as described above are disposed a polarizer 112 and an analyzer 114 in the form of cross nicols, whereby optical modulation is effected through orientation modulation of the ferroelectric liquid crystal 113.

As described hereinbefore, in order to produce a ferroelectric liquid crystal device provided with a memory function, it is necessary to form a very thin liquid crystal layer as thin as $0.1–3\mu$ and to regulate the fluctuation in layer thickness to be 10% or less, e.g., $0.1\mu$ or less for a layer thickness of $1\mu$. According to the present invention, such a uniform liquid crystal layer thickness with fluctuation in layer thickness of 10% or less can be formed by providing a liquid crystal cell having a substrate 102 of a flexible glass or a plastic film satisfying the following relationship:

$$\frac{a^4}{Et^3} < 0.32,$$

wherein E denotes a modulus of elasticity (kg.f/mm$^2$) of the substrate 102, t denotes the thickness of the substrate (mm) and a is a spacing (mm) between adjacent spacer members 111.

In a preferred embodiment of the present invention, a uniform liquid crystal layer is provided by using a flexible glass or plastic film as the substrate 102 and forming a reduced pressure space as shown in FIG. 3 in the cell 100 so as to cause the substrate 102 to closely contact the spacer members 111. If the substrate 102 is too flexible, decrease in layer thickness at a midpoint between adjacent spacer members can be problematic. On the other hand, if the substrate is too rigid, it cannot sufficiently deform so as to compensate for the deviation from flatness of the substrate 101. When a plastic film such as uniaxially stretched polyester film, or isotropic polyvinyl chloride or polyether sulfone formed by extrusion, etc., is used as the substrate 102, the deformation at midpoint between spacer members can be a problem. However, if the spacing between spacer members is 0.1 mm, the deformation is of the order of $0.1\mu$ (under compression with atmospheric pressure) which is within a practically acceptable range, for a film thickness of $25\mu$. Further, when a film with a thickness of the order of $100\mu$ is used, the deformation is of the order of $0.1\mu$, even if the spacing between spacer members 111 is 0.5 mm, so that a sufficiently accurate liquid crystal layer thickness is obtained if the spacing between the spacer members is restricted to 0.5 mm or less. When a glass plate is used as the substrate 102, it should be sufficiently thin so that it can deform corresponding to the planarity of the substrate 101. When an ordinary glass plate without polishing is used as the substrate 101, it has a deviation of the order of $10\mu$ from the perfect flatness for an extension of 100 mm. On the other hand, when a 0.1 mm-thick glass plate is used as the substrate 102, the deformation thereof under the atmospheric pressure while contacting spacer members 111, 100 mm spaced apart from each other is much larger than $10\mu$. Therefore, it will be understood that the span for deformation of the substrate 102, i.e., the spacing between adjacent spacer members 111, should be less than 100 mm. The deformation of $0.1\mu$ is given by a spacing of 1–2 mm between spacer members 111. For this range of extension, the deviation from the flatness of the substrate 101 is less than $0.1\mu$, so that a sufficient accuracy in liquid crystal layer thickness can be attained. For obtaining a sufficient deformation with a glass plate so as to follow the substrate 101 as described above, the thickness of the glass plate should be 0.3 mm or less and preferably 0.2 mm or less if the fluctuation in planarity of the substrate 101 and the fluctuation in pressure during the injection and sealing of the liquid crystal material are also taken into consideration.

Figure 5:
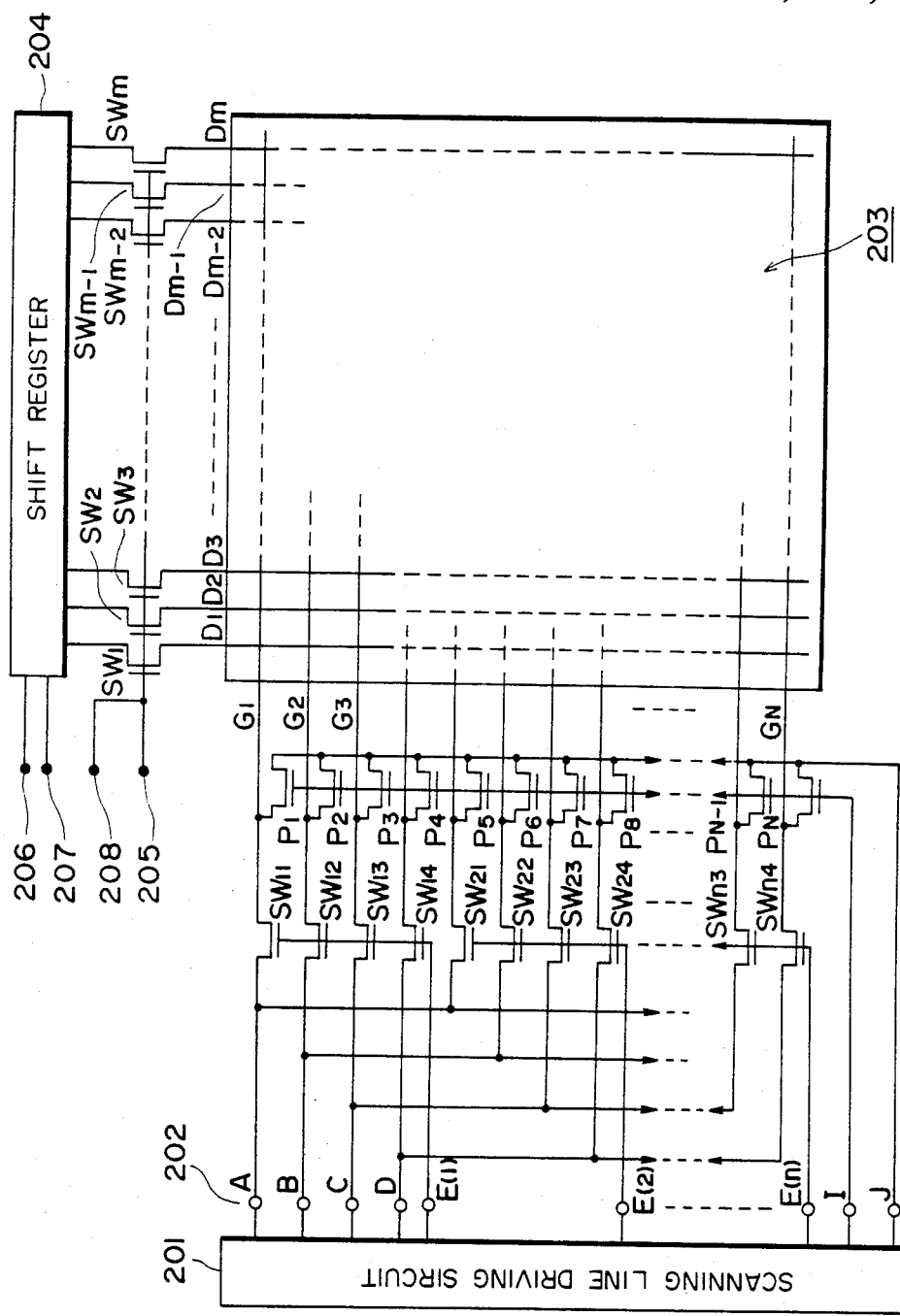
FIGS. 5 and 6 are explanatory views for illustrating a driving circuit used in the present invention.

FIG. 5 illustrates a circuit diagram wherein the circuits 105 and 106 are respectively composed of thin film transistors with semiconductors of polycrystalline silicon, amorphous silicon or cadmium selenide. $SW_{11}$–$SW_{n4}$ are divisional switching elements formed of thin film transistors and E(1)–E(n) are division block selection lines for controlling the divisional switching elements connected to the gates. As the number of common lines is 4 in this embodiment, n is equal to N/4. $P_1$–$P_N$ are discharge switching elements formed of thin film transistors, while I is a discharge controlling line and J is a discharge potential line. A scanning line driving circuit 201 is provided as an external controlling circuit for driving scanning lines connected to common lines A, B, C and D and is connected to the circuit substrate through connections 202.

In order to drive the display member 203, pulses are repeatedly applied to common lines A, B, C and D, and division block selection lines E(1)–E(n) are sequentially turned ON/OFF. Further, a pulse is applied to the discharge controlling line I so as to control the potential of the lines $G_1$–$G_N$ at $-V$ volts at non-selection time through $P_1$–$P_N$.

While an embodiment wherein N scanning lines and 4 common lines are used, has been explained above, other combinations are of course possible. For example, if 480 scanning lines and 24 scanning lines are used, 20 division block selection signals are required and the number of total connections with the external controlling circuit is reduced to 46 including two connections for a discharge controlling line and a discharge potential line, thus about 90% of the connections being reduced.

The driving circuit 106 comprises switching elements $SW_1$–$SW_m$, each composed of a thin film transistor. Video information signals are transferred from an external controlling circuit to a shift register 204, and then the terminal 205 connected to the gates of $SW_1$–$SW_m$ is turned off, whereby the shift register 204 is latched to the state at that time and the corresponding signals are applied to data lines $D_1$–$D_m$ connected to the sources. The shift register 204 has a clock terminal 206 and a data input terminal 207. The same signal as the OFF data level is applied to a terminal 208.

FIG. 1 is a schematic plan view of an embodiment of the liquid crystal cell according to the present invention. In this embodiment, transparent electrodes are actually formed on the substrate in the form of stripes for matrix driving and connected to an external driving circuit, but they are not shown in the figure.

According to this embodiment, several liquid crystal cells were prepared by using various thicknesses t (mm) of thin glass plates as flexible substrate and spacer stripes with varying spacings a (mm) therebetween and subjected to evaluation of deviation W (maximum-minimum) in liquid crystal cell thickness and image quality. Herein, the spacer height was set at $2\mu$. The results of the evaluation are summarized in the following table.

|  | t = 0.3 |  | t = 0.2 |  |
| --- | --- | --- | --- | --- |
| a | 0.3 | 0.3 | 2 | 4 |
| w | $3 \times 10^{-4}$ | ~0 | $6 \times 10^{-5}$ | $5 \times 10^{-4}$ |
| Evaluation | Δ | O | O | x |

|  | t = 0.1 |  |  | t = 0.05 |  |  |
| --- | --- | --- | --- | --- | --- | --- |
| a | 0.1 | 0.3 | 1 | 0.1 | 0.3 | 1 |
| w | ~0 | ~0 | $3 \times 10^{-5}$ | ~0 | ~0 | $3.5 \times 10^{-4}$ |
| Evaluation | O | O | O | O | O | Δ |
|  |  |  |  |  |  | [mm] |

The standards of evaluation are as follow:
O: Good image quality (deviation in liquid crystal layer thickness being less than 10%)
Δ: Practically acceptable level but not satisfactory
x: Not acceptable.

In another embodiment, spacers arranged in the form of lattice were used with columns of $10\mu$-diameter at lattice points, and experiments were conducted otherwise in the same manner as the above embodiment, whereby similar evaluation results were obtained with respect to the relations of the parameters a, w and t and the image quality.

The amount of deformation at midpoint between adjacent spacers of a flexible substrate is proportional with $a^4/Et^3$, wherein E denotes the modulus of elasticity of the substrate. The elasticity of glass is roughly 7000 Kg.f/mm$^2$ and the value of $a^4/Et^3$ should be below 0.32 in order to suppress the maximum deformation below $0.1\mu$. The above experimental results agree with this estimation.

Figure 6:
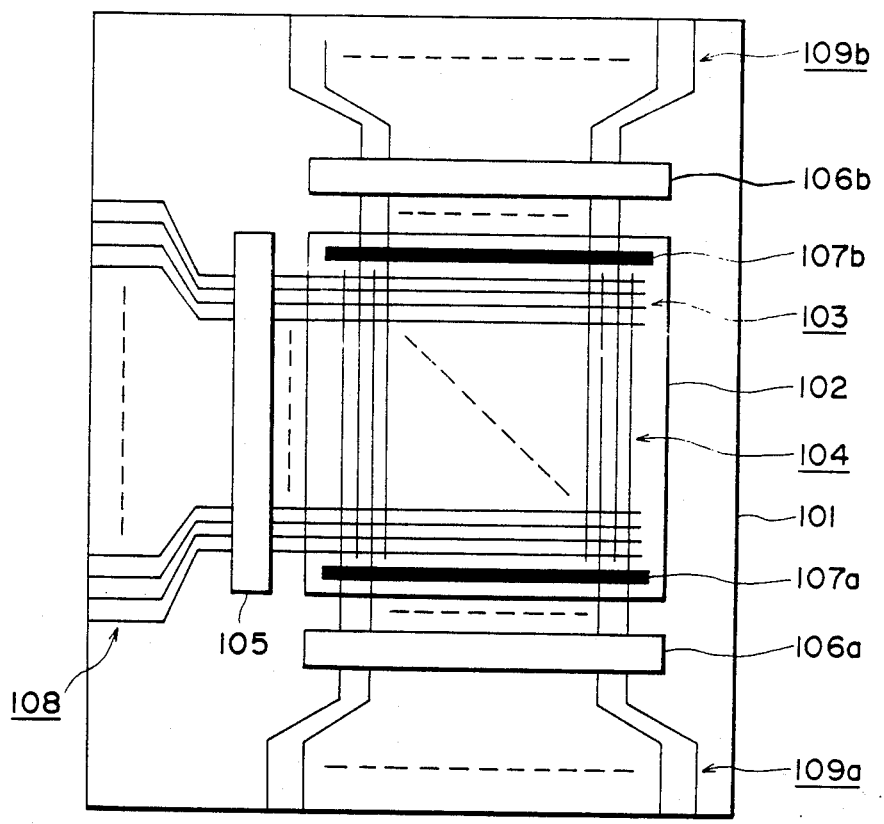

FIG. 6 shows another embodiment of the display device according to the present invention, wherein the same reference numerals denote the same members as shown in FIGS. 4 and 5.

The display device shown in FIG. 6 is similar to the one shown in FIG. 4 except that the terminals 109 of the electrodes 104 are divided into the terminals 109a and 109b. As a result, in this embodiment, there are disposed two anisotropic conductive members 107a and 107b to be electrically connected with the respective terminals 109a and 109b and driving circuits 106a and 106b, respectively, therefor.

In this display device, the terminals 109a and 109b can be arranged in a smaller density per unit length and electrical connection thereof with external controlling circuits can be effected without causing short circuit between terminals.

As described above, a required accuracy of liquid crystal layer thickness as necessary for providing a ferroelectric liquid crystal cell is realized in a large area, by using a flexible substrate and sealing a liquid crystal under reduced pressure in the presence of spacer members. Further, a large area of display device with a high density of picture elements can be provided by disposing only stripe electrodes on the flexible substrate and connecting them with driving elements comprising thin film transistors disposed on the other substrate so as to make easy electrical connection of a large number of electrodes.

As the ferroelectric liquid crystal to be used in the present invention, chiral smectic liquid crystals are most preferred, of which those showing chiral smectic C phase (SmC*), H phase (SmH*), I phase (SmI*), J phase (SmJ*), K phase (SmK* ), F phase (SmF*) and G phase (SmG*) are suitably used. These ferroelectric liquid crystals are described in, e.g., "*LE JOURNAL DE PHYSIQUE LETTERS*" 36 (L-69), 1975 "*Ferroelectric Liquid Crystals*"; "*Applied Physics Letters*" 36 (11) 1980, "*Submicro Second Bistable Electrooptic Switching in Liquid Crystals*", "*Solid State Physics*" 16 (141), 1981 "*Liquid Crystal*", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxy-benzylidene-p'-amino-2-chloropropyl cinnamate (HOBACPC), 4-o-(2-methyl)-butylresorcilidene-4'-octylaniline (MBRA8), etc.

When a device is constituted using these materials, the device may be supported with a block of copper, etc., in which a heater is embedded in order to realize a temperature condition where the liquid crystal compounds assume a smectic phase such as SmC*, SmH*, SmI*, SmJ*, SmK*, SmF* and SmG*.

Figure 7:
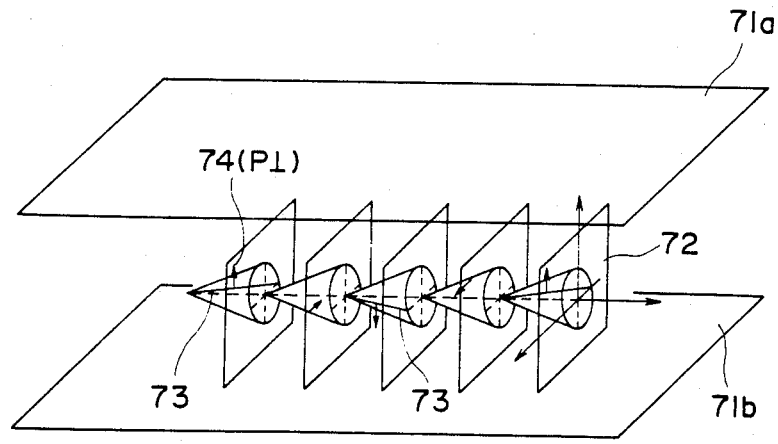
FIGS. 7 and 8 are schematic perspective views illustrating the operation principle of a ferroelectric liquid crystal device used in the present invention.
Figure 8:
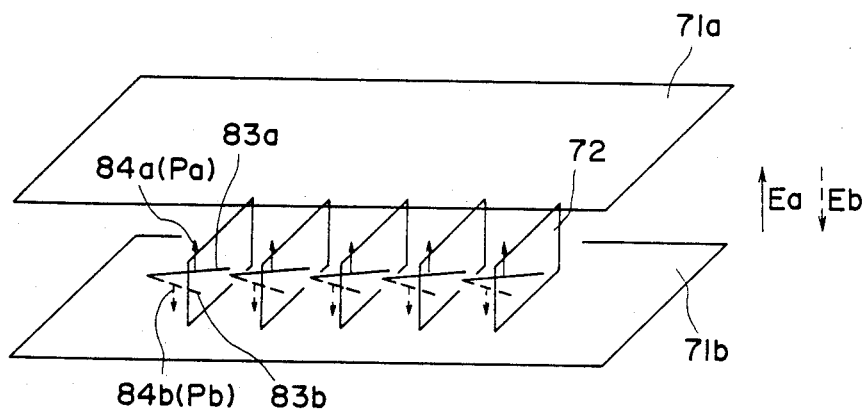

Referring to FIG. 7, there is schematically shown an example of a ferroelectric liquid crystal cell for explanation of the operation thereof. Reference numerals 71a and 71b denote base plates (glass plates) on which a transparent electrode of, e.g., In$_2$O$_3$, SnO$_2$, ITO (Indium-Tin Oxide), etc., is disposed, respectively. A liquid crystal of, e.g., an SmC*-phase in which liquid crystal molecular layers 72 are oriented perpendicular to surfaces of the glass plates is hermetically disposed therebetween. A full line 73 shows liquid crystal molecules. Each liquid crystal molecule 73 has a dipole moment (P⊥) 74 in a direction perpendicular to the axis thereof. When a voltage higher than a certain threshold level is applied between electrodes formed on the base plates 71a and 71b, a helical structure of the liquid crystal molecule 73 is loosened or unwound to change the alignment direction of respective liquid crystal molecules 73 so that the dipole moments (P⊥) 74 are all directed in the direction of the electric field. The liquid crystal molecules 73 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., $1\mu$), the helical structure of the liquid crystal molecules is loosened even in the absence of an electric field whereby the dipole moment assumes either of the two states, i.e., Pa in an upper direction 84a or Pb in a lower direction 84b as shown in FIG. 8. When electric field Ea or Eb higher than a certain threshold level and different from each other in polarity as shown in FIG. 8 is applied to a cell having the above-mentioned characteristics, the dipole moment is directed either in the upper direction 84a or in the lower direction 84b depending on the vector of the electric field Ea or Eb. In correspondence with this, the liquid crystal molecules are oriented in either of a first stable state 83a (bright state) and a second stable state 83b (dark state).

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 8. When the electric field Ea is applied to the liquid crystal molecules, they are oriented in the first stable state 83a. This state is kept stable even if the electric field is removed. On the other hand, when the electric field Eb of which direction is opposite to that of the electric field Ea is applied thereto, the liquid crystal molecules are oriented to the second stable state 83b, whereby the directions of molecules are changed. This state is also kept stable even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.1 to 3μ. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

What is claimed is:

1. A liquid crystal cell comprising a pair of substrates disposed with a gap therebetween; a liquid crystal injection port; a liquid crystal injected through the liquid crystal injection port and enclosed in the gap between the substrates to form a liquid crystal layer region; spacer members disposed on at least one of the substrates to regulate the thickness of the liquid crystal layer region; and a reduced pressure space in communication with said liquid crystal layer region.

2. The liquid crystal cell according to claim 1, wherein the volume of said reduced pressure space is 1/1000 or more of that of the liquid crystal layer.

3. The liquid crystal cell according to claim 1, wherein the volume of said reduced pressure space is 1/100 or more of the liquid crystal layer.

4. The liquid crystal cell according to claim 1, further comprising a connecting portion between said liquid crystal region and said reduced pressure space; the path length from said injection port to said connecting portion being the same as or longer than the maximum path length from the liquid crystal layer region to the injection port.

5. The liquid crystal cell according to claim 4, wherein said connecting portion forms a throat.

6. The liquid crystal cell according to claim 1, wherein at least one of said pair of substrates is flexible.

7. The liquid crystal cell according to claim 1, wherein said reduced pressure space is provided by a groove formed in at least one of the substrates.

8. The liquid crystal cell according to claim 1, wherein said liquid crystal is a ferroelectric liquid crystal.

9. The liquid crystal cell according to claim 8, wherein said ferroelectric liquid crystal is a chiral smectic liquid crystal.

10. The liquid crystal cell according to claim 9, wherein said chiral smectic liquid crystal is formed in a layer of 3μ or less in thickness and has bistability with non-spiral texture.

11. The liquid crystal cell according to claim 1, wherein the pressure of said reduced pressure space is ½ atmosphere or below.

12. The liquid crystal cell according to claim 1, wherein the pressure of said reduced pressure space is 1/10 to ½ atmosphere.

13. The liquid crystal cell according to claim 1, wherein an inert gas is enclosed in said reduced pressure space.

14. The liquid crystal cell according to claim 13, wherein said inert gas is $N_2$ gas, $CO_2$ gas, Ar gas or Ne gas.

15. The liquid crystal cell according to claim 13, wherein said inert gas is enclosed at a pressure of 1/10 atmosphere or below in said reduced pressure space.

16. The liquid crystal cell according to claim 13, wherein said inert gas is enclosed at a pressure of 1/1000 to 1/10 atmosphere in said reduced pressure space.

17. The liquid crystal cell according to claim 1, wherein said reduced pressure space is provided in a region enclosed with a frame.

18. A liquid crystal cell comprising: a cell structure comprising a pair of substrates disposed with a gap therebetween, a plurality of spacer members disposed between the substrates to maintain the gap, and a ferroelectric liquid crystal enclosed in the cell structure; at least one of the substrates being flexible and said spacer members being disposed with a spacing a (mm) from each other satisfying the relationship $$\frac{a^4}{Et^3} > 0.32$$

wherein E denotes the modulus of elasticity (Kg.f/mm$^2$) of the flexible substrate and t denotes the thickness (mm) of the flexible substrate.

19. The liquid crystal cell according to claim 18, wherein the flexible substrate comprises a glass plate having a thickness of 0.2 mm or less.

20. The liquid crystal cell according to claim 18, wherein said flexible substrate is a uniaxially stretched film having a thickness of 25μ or more.

21. The liquid crystal cell according to claim 20, wherein said uniaxially stretched film is uniaxially stretched polyester film.

22. The liquid crystal cell according to claim 18, wherein said spacer members have a thickness of 0.1 to 3μ.

23. The liquid crystal cell according to claim 18, wherein said spacer members are arranged in the form of parallel stripes with a spacing of 2 mm or less from each other.

24. The liquid crystal cell according to claim 18, wherein said spacer members are arranged in the form of parallel stripes with a spacing of 2 mm or less from each other.

25. The liquid crystal cell according to claim 18, wherein said spacer members are arranged in the form of a lattice, each unit of which has a longer side length of 2 mm or less.

26. The liquid crystal cell according to claim 18, wherein said spacer members are arranged in the form of a lattice, each unit of which has a longer side length of 800μ or less.

27. The liquid crystal cell according to claim 18, wherein said spacer members are arranged in the form of dots with a spacing of 2 mm or less from each other.

28. The liquid crystal cell according to claim 18, wherein said spacer members are arranged in the form of dots with a spacing of 800μ or less from each other.

29. The liquid crystal cell according to claim 18, wherein said cell structure also encloses a reduced pressure space.

30. The liquid crystal cell according to claim 18, wherein said ferroelectric liquid crystal is a chiral smectic liquid crystal.

31. The liquid crystal cell according to claim 30, wherein said chiral smectic liquid crystal assumes non-spiral texture.

32. The liquid crystal cell according to claim 30, wherein said chiral smectic liquid crystal is in C phase, H phase, I phase, J phase, K phase, G phase or F phase.

33. A liquid crystal device comprising:
- a non-flexible first substrate provided with a first group of electrodes, a first driving circuit connected to said first group of electrodes and a second driving circuit,
- a flexible second substrate provided with a second group of electrodes, and
- a ferroelectric liquid crystal disposed between the first and second substrates; said second electrode group connected to said second driving circuit, said first and second driving circuits being respectively connected to an external controlling circuit.

34. The liquid crystal device according to claim 33, wherein said first and second electrode groups, in combination, form a matrix electrode structure.

35. The liquid crystal device according to claim 33, wherein said first group of electrodes constitute scanning lines for applying scanning signals, and said second group of electrodes constitute data lines for applying information signals.

36. The liquid crystal device according to claim 33, wherein said first group of electrodes constitute data lines for applying information signals, and said second group of electrodes constitute scanning lines for applying scanning signals.

37. The liquid crystal device according to claim 33, wherein said ferroelectric liquid crystal is a chiral smectic liquid crystal.

38. The liquid crystal device according to claim 37, wherein said chiral smectic liquid crystal assumes non-spiral texture.

39. The liquid crystal device according to claim 37, wherein said chiral smectic liquid crystal is in C phase, H phase, I phase, J phase, K phase, G phase or F phase.

40. The liquid crystal device according to claim 33, wherein said non-flexible first substrate comprises a thick glass plate having a thickness of 0.3 to 2 mm, and said flexible second substrate comprises a thin glass plate having a thickness of 20 to 300μ.

41. The liquid crystal device according to claim 33, wherein said non-flexible first substrate comprises a thick glass plate having a thickness of 0.3 to 2 mm, and said flexible second substrate comprises a plastic film.

42. The liquid crystal device according to claim 41, wherein said plastic film is polyethylene terephthalate film, isotropic polyvinyl chloride film or polyether-sulfone film.

* * * * *

UNITED STATES PATENT AND TRADEMARK OFFICE
CERTIFICATE OF CORRECTION

PATENT NO. : 4,682,858

DATED : July 28, 1987

INVENTOR(S) : JUNICHIRO KANBE, ET AL.

It is certified that error appears in the above-identified patent and that said Letters Patent is hereby corrected as shown below:

IN THE DRAWINGS/SHEET 3 OF 5

FIG. 5, "SIRCUIT" should read --CIRCUIT--.

COLUMN 6

Line 12, "to to" should read --to--.

COLUMN 7

Line 21, "0.1 3µ" should read --0.1 to 3µ--.

COLUMN 8

Line 3, "other is" should read --other, is--.
Line 45, "24 scanning" should read --24 common--.

UNITED STATES PATENT AND TRADEMARK OFFICE
CERTIFICATE OF CORRECTION

PATENT NO. : 4,682,858

DATED : July 28, 1987

INVENTOR(S) : JUNICHIRO KANBE, ET AL.

It is certified that error appears in the above-identified patent and that said Letters Patent is hereby corrected as shown below:

COLUMN 11

Line 3, "and" should read --or--.

COLUMN 12/CLAIM 18

Lines 35-36, "$\frac{a^4}{Et^3} > 0.32$" should read -- $\frac{a^4}{Et^3} < 0.32$ --.

Signed and Sealed this

Fifteenth Day of December, 1987

Attest:

DONALD J. QUIGG

Attesting Officer

Commissioner of Patents and Trademarks